US011023185B2

(12) United States Patent
Shramm et al.

(10) Patent No.: US 11,023,185 B2
(45) Date of Patent: Jun. 1, 2021

(54) COLLECTIVE AWARENESS OF SUPPLIES

(71) Applicant: HEWLETT-PACKARD DEVELOPMENT COMPANY, L.P., Spring, TX (US)

(72) Inventors: Morgan T Shramm, Vancouver, WA (US); Wesley R Schalk, Vancouver, WA (US); Duane A Koehler, Vancouver, WA (US); Howard G Wong, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/604,148

(22) PCT Filed: Jan. 8, 2018

(86) PCT No.: PCT/US2018/012844
§ 371 (c)(1),
(2) Date: Oct. 9, 2019

(87) PCT Pub. No.: WO2019/135776
PCT Pub. Date: Jul. 11, 2019

(65) Prior Publication Data
US 2020/0326896 A1  Oct. 15, 2020

(51) Int. Cl.
*G06F 3/12* (2006.01)
(52) U.S. Cl.
CPC ............ *G06F 3/1235* (2013.01); *G06F 3/121* (2013.01); *G06F 3/1273* (2013.01); *G06F 3/1288* (2013.01)

(58) Field of Classification Search
None
See application file for complete search history.

(56) References Cited

U.S. PATENT DOCUMENTS

| 9,415,601 | B1 | 8/2016 | Tsukida | |
|---|---|---|---|---|
| 9,573,807 | B1 | 2/2017 | Kaufman et al. | |
| 2007/0076024 | A1 | 4/2007 | Jeong et al. | |
| 2007/0279668 | A1* | 12/2007 | Czyszczewski | G06F 3/1288 358/1.14 |
| 2008/0232829 | A1* | 9/2008 | Golding | G03G 15/556 399/27 |
| 2009/0112738 | A1 | 4/2009 | Nagata | |
| 2013/0346259 | A1* | 12/2013 | Lakshana | G06K 1/00 705/28 |
| 2016/0200115 | A1 | 7/2016 | Niiyama | |
| 2017/0120581 | A1 | 5/2017 | Hogan et al. | |

FOREIGN PATENT DOCUMENTS

| JP | 2006001100 A | 1/2006 |
|---|---|---|
| JP | 2011243000 A | 12/2011 |

* cited by examiner

*Primary Examiner* — Frantz Bataille
(74) *Attorney, Agent, or Firm* — HP Inc. Patent Department

(57) ABSTRACT

In one example, collective awareness of supplies includes several operations. A remaining level for each supply in a printer device within a fleet of printer devices is measured. A predicted usage model for each supply from a history of supply usage for printed pages over time in the printer device and other printer devices of the fleet of printer devices is calculated. A system intervention event based on the predicted usage model and remaining level for each supply in the printer device is determined. The system intervention event is communicated to a responsible party.

15 Claims, 7 Drawing Sheets

COLLECTIVE AWARENESS OF SUPPLIES

BACKGROUND

Printer devices such as laser printers, inkjet printers, fax machines, all-in-ones, copiers, mopiers, and the like consume large amounts of supplies used to make hardcopy output. In businesses with fleets of printer devices, such printer devices are shared amongst several users and are expected to be "at the ready" when needed. Maintaining fleets of printers is a difficult task. Fleet servicing has tended to require trained remote agents. Due to a requirement to service multiple customers, scheduling service calls capably has become complex and inefficient. This inefficiency has increased fleet maintenance costs, the likelihood of unnecessary downtime, and lost productivity of workers.

BRIEF DESCRIPTION OF THE DRAWINGS

The disclosure is better understood regarding the following drawings. The elements of the drawings are not necessarily to scale relative to each other. Rather, the emphasis has instead been placed upon illustrating the claimed subject matter. Furthermore, like reference numerals designate corresponding similar parts through the several views. For brevity, reference numbers used in later drawings that are repeated may not be re-described.

DETAILED DESCRIPTION

Disclosed herein is an improved method, device, and software for improving the servicing of printer devices within one or more fleets of printers. "Collective Awareness" pertains to an idea in which each printer devices within a fleet of printer devices can access not only its own supplies status and management features but also that of other similar printer devices at the same physical and/or network location. With such collective awareness, various responsible parties may inquire about the supply status of the entire fleet. Further, information generated by printer devices within the fleet may be used to help create a predictive usage model for a printer device to determine better an amount of supplies remaining, an estimated time, or an estimated number of pages remaining until replenishment is needed. Accordingly, unlike traditional approaches where only the instant printer device may be queried about its supply status, collective awareness allows for the capability to receive supply information from other connected printer devices and use such information for more accurate supply usage models as well as fleet monitoring to access other printer device supply status for servicing. More detail on example implementations of collective awareness and their benefits follow.

Figure 1:
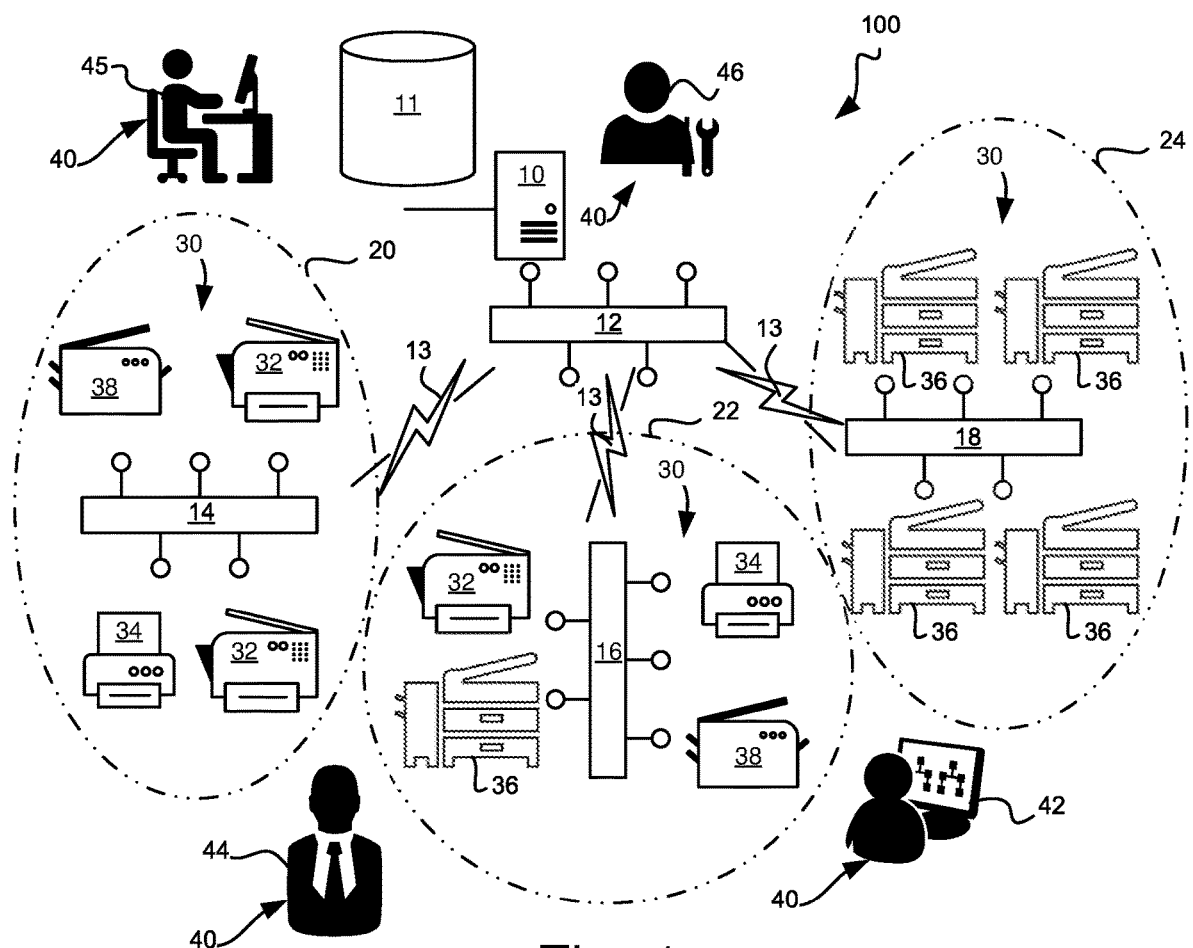
FIG. 1 is a block diagram of an example environment of multiple fleets of printers having a collective awareness of supplies.

FIG. 1 is a block diagram of an example environment 100 of multiple fleets 20, 22, 24 of printer devices 30 having a collective awareness of supplies. Printer devices 30 may include many different types of printer devices 30 including printers, plotters, photocopiers, mopiers, all-in-ones, fax machines, offset printers, 3D printers, as just some examples. Various technologies may be used for marking or making prints including such marking materials as toner, liquid ink, liquid dye, wax, dye sublimation, and thermal papers and ink. In some examples, a fleet 20, 22, 24 of printers may include multiple types of printers and types of printing technologies. In other examples, there may be mostly one type of printer device 30 using one type of printing technology, such as multi-function all-in-ones (scanning, printing, copying, faxing, storing, etc.). Responsible parties 40 interacting with the printer devices 30 include, but are not limited to, company and third-party service personnel 46 including printer technicians, users 42, and on and off-site administrators 45 such as IT department personnel, procurement personnel, servicing personnel, and management.

In FIG. 1, a server 10 is connected to a server communication channel 12, typically a network based off an intranet or Internet technology. Server 10 may be of one or more physical or logical processors and may be implemented as discrete computing components, as data center based, or as cloud-based and various combinations thereof. Server 10 may include one or more databases 11 for storing usage history and other statistics of printer devices 30 in one or more fleets 20, 22, 24 of printer devices 30. Fleets 20, 22, 24 may include one or more types of printer devices 30 and printer technologies but in many examples, will be of a particular printer technology but different printer devices 30 using a particular printing technology such as laser or inkjet.

In the example shown, the first fleet 20 includes a set of printer devices 30 including multiple personal printers 32, a fax machine 34, and a shared printer 38 all connected to a first communication channel 14, typically a wired, wireless, optical or hybrid network-based interface, but in some examples first communication channel 14 could be a custom interface. Second fleet 22 includes a set of printer devices 30 including a personal printer 32, a fax machine 34, an all-in-one multi-function printer 36, and a shared printer 38 all connected to a second communication channel 16. Third fleet 24 includes a set of all-in-one multi-function printers 36 coupled to a third communication channel 18. The communication channels 12, 14, 16, 18 may be implemented using wired, wireless, optical, or other communication technologies. The first communication channel 14, second communication channel 16, and third communication channel 18 are coupled to the server communication channel 12 using one or more networks 13, which may be private, public, or hybrid communication channels including intranets and Internet. The networks 13 may be optical, wireless, or wired and use one or more networking protocols such as TCP/IP and UDP.

The first fleet 20, the second fleet 22, and the third fleet 24 may be from a single corporate entity, or they may be from different corporate entities. The server 10 may be part of a corporate entity that has possession of the fleets 20, 22, 24 or it may be a separate entity from a possessor 44 of the fleets 20, 22, 24. A possessor 44 is the legal owner/lessee/renter of the fleet whether purchased, leased, or rented, respectively. The server 10 may be part of a printer device servicing company. In other examples, server 10 may be controlled by the same corporate entity as the possessor 44 of the fleets 20, 22, 24. In any event, a front panel user interface 15 of a printer device 30 may be used to view and manage its own supplies status. However, with collective awareness, the front panel user interface 15 of a printer device 30 may also be used to assess the needs of the entire local fleet 20, 22, 24 of printer devices 30. This capability is particularly useful for printer device 30 that use refillable supplies but may also be used with traditional cartridge-based supply systems. This ability to see the supplies status of the entire local fleet 20, 22, 24 allows for responsible parties 40 to quickly and efficiently determine the kind and amounts of supplies needed to service an entire location, as well as prioritize which printer devices 30 require attention first. This capability helps to prevent having to visit and respond to every printer device 30 in an individual manner.

Figure 2:
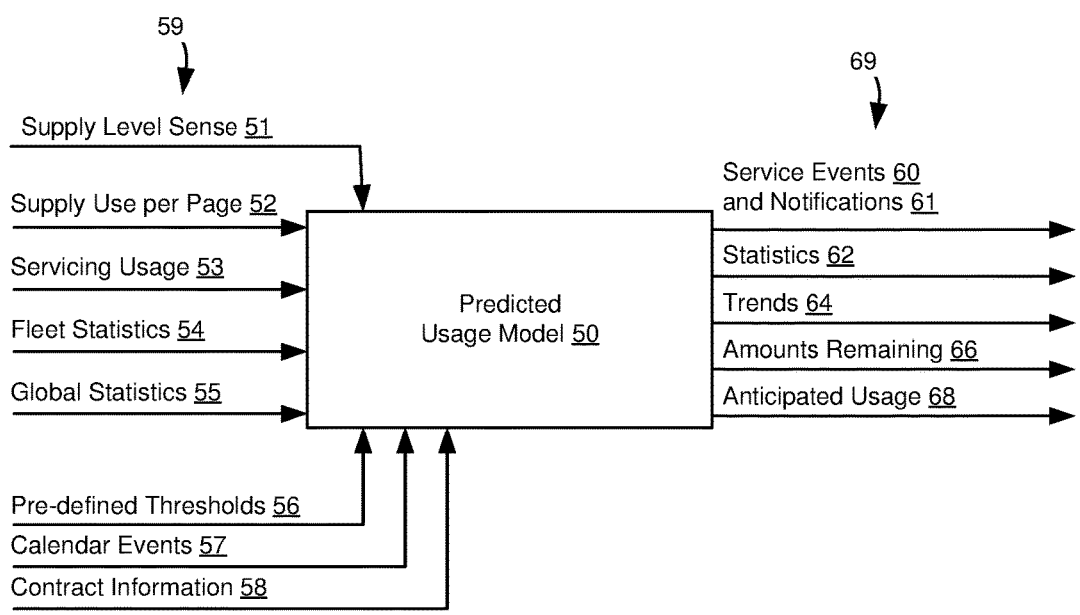
FIG. 2 is a block diagram of an example predicted usage model with possible example inputs and possible example outputs.

FIG. 2 is a block diagram of an example predicted usage model 50 with example possible inputs 59 and example possible outputs 69. Possible inputs 59 include supply level sense 51, supply use per page 52, servicing usage 53, fleet statistics 54, global statistics 55, pre-defined thresholds 56, calendar events 57, and contract information 58. Possible outputs 69 include service events 60 and notifications 61, statistics 62, trends 64, amounts remaining 66, and anticipated usage 68.

Supply level sense 51 may include one or more sensors to detect the amount of remaining toner, ink, dye, wax or other marking material. When there are multiple colors, such as cyan (C), magenta (M), yellow (Y), and black (K), each color may have its own supply level sense 51. In some examples, the multiple colors may be integrated into a single cartridge, and the supply level sense may return the lowest supply level. Supply use per page 52 may be a historical record of how much of a supply is used per page for the particular printer device 30, or it may be a characterized amount based on testing of multiple printer devices 30. In some examples, the amount of supply per page 52 may be indexed by the type of page (color, mono (B/W), mixed mode), paper size (letter, legal, A4, A3, etc.), and mode of printing (professional, general office, draft, economy, essential, etc.). Servicing usage 53 may be an amount of the supplies 80 reserved for use in servicing a printer device 30. For instance, some ink-jet type printers may need to be serviced to ensure no nozzle out events, to clean the printhead to ensure accurate dot placement, to align different color printheads, etc. Fleet statistics 54 may include supply use per page 52 information requested from like printer devices 30 within the same fleet 20, 22, 24 and/or it may include collated and historical data from like printer devices 30 in the fleet 20, 22, 24 from server 10 and database 11. Global statistics 55 may include fleet statistics 54 of other fleets 20, 22, 24 of printers with like printer devices 30. The other fleets 20, 22, 24 may be from the same corporate entity and/or different entities. Pre-defined thresholds 56 may be set by a user 42, administrator, or another responsible party 40 or defaults used for the particular printer device 30. The pre-defined thresholds 56 may be expressed in days remaining, pages remaining, or amount of supply remaining, or another contract based requirement. Contract information 58 may include details from servicing contracts that may be used to determine how long a service contract is valid, what type of servicing is available, what options are available for servicing, what parties may provide servicing, and which of the printer devices 30 are currently under an active contract.

Time and/or dates may be used to apportion possible inputs 59 into daily, weekly, monthly, or other periodic time or date based statistics. For instance, supply use per page 52 may change daily over a week or even within weeks of a month. Calendar events 57 may include information such as special events (end of the fiscal quarter, end of the fiscal year, auditing times, management visits, seasonal changes, etc.) that reflect expected periods of high printer usage for drafts, spreadsheets, reports, etc. such as at an end of the month rush, or specific calendar year variations like tax season. The predicted usage model 50 uses the various possible inputs 59 to calculate and predict the possible outputs 69 and may be performed with the local history of a specific printer device 30, or take the fleet statistics 54 and global statistics 55 into account.

For instance, service events 60 and notifications 61 may include one or more service events 60 for scheduling servicing or notifications 61 for alerting a service provider for a printer device 30 and its respective fleet 20, 22, 24 of other printer devices 30. The service events 60 and notifications 61 may be pre-defined by the printer device's responsible party 40, or another administrator, service provider, or printer manufacturer to best support a particular service model defined by the contract information 58. Service events 60 and notifications 61 may be pre-set when the printer devices 30 are deployed and may be adjusted as needed as usage changes.

Statistics 62 may include calculated predicted usage for each color based on print history evaluated over time durations, cyclical events (such as days, weeks, months, etc.), number of pages, etc. The statistics 62 may be transferred to the server 10 and database 11 and/or the information may also be available on a user interface 15 that may be accessed either at a local printer device 30 front panel, a mobile device screen, or a screen of a cloud-based device management tool. The statistics 62 may include mean, median, standard deviation and other statistical measures.

For example, given a supply level sense (SLS) 51 and supply use per page 52, the predicted usage model may create statistics 62 to create a simple averaging model for an estimation of how long until a replenishment event would be required.

C_Daily_Est.=C_SLS(Beg. of Month)-C_SLS(End of Month)/30 days

M_Daily_Est.=C_SLS(Beg. of Month)-M_SLS(End of Month)/30 days

Y_Daily_Est.=C_SLS(Beg. of Month)-Y_SLS(End of Month)/30 days

K_Daily_Est.=C_SLS(Beg. of Month)-K_SLS(End of Month)/30 days

Given this model, one could imagine values of:

C_Daily_Estimation=10 mL/Day

M_Daily_Estimation=12 mL/Day

Y_Daily_Estimation=15 mL/Day

K_Daily_Estimation=13 mL/Day

Now assume that the current supply reported by the supply level sense 51 is:

C=80 mL, M=400 mL, Y=100 mL, K=400 mL

It is then estimated that the Y supply will run out first in less than 7 days according to the current run rate (100 mL/15 mL/Day=6.777 days).

Predicted usage model 50 may also create trends 64, such as rates of how fast the daily estimates are changing from previous months or days. Also, the predicted usage model 50 may include what amounts are remaining 66 from the supply level sense 51, less the expected servicing usage 53. Other possible outputs may include the anticipated usage 68 based on the statistics 62 and trends 64 and amounts remaining 66.

Figure 3:
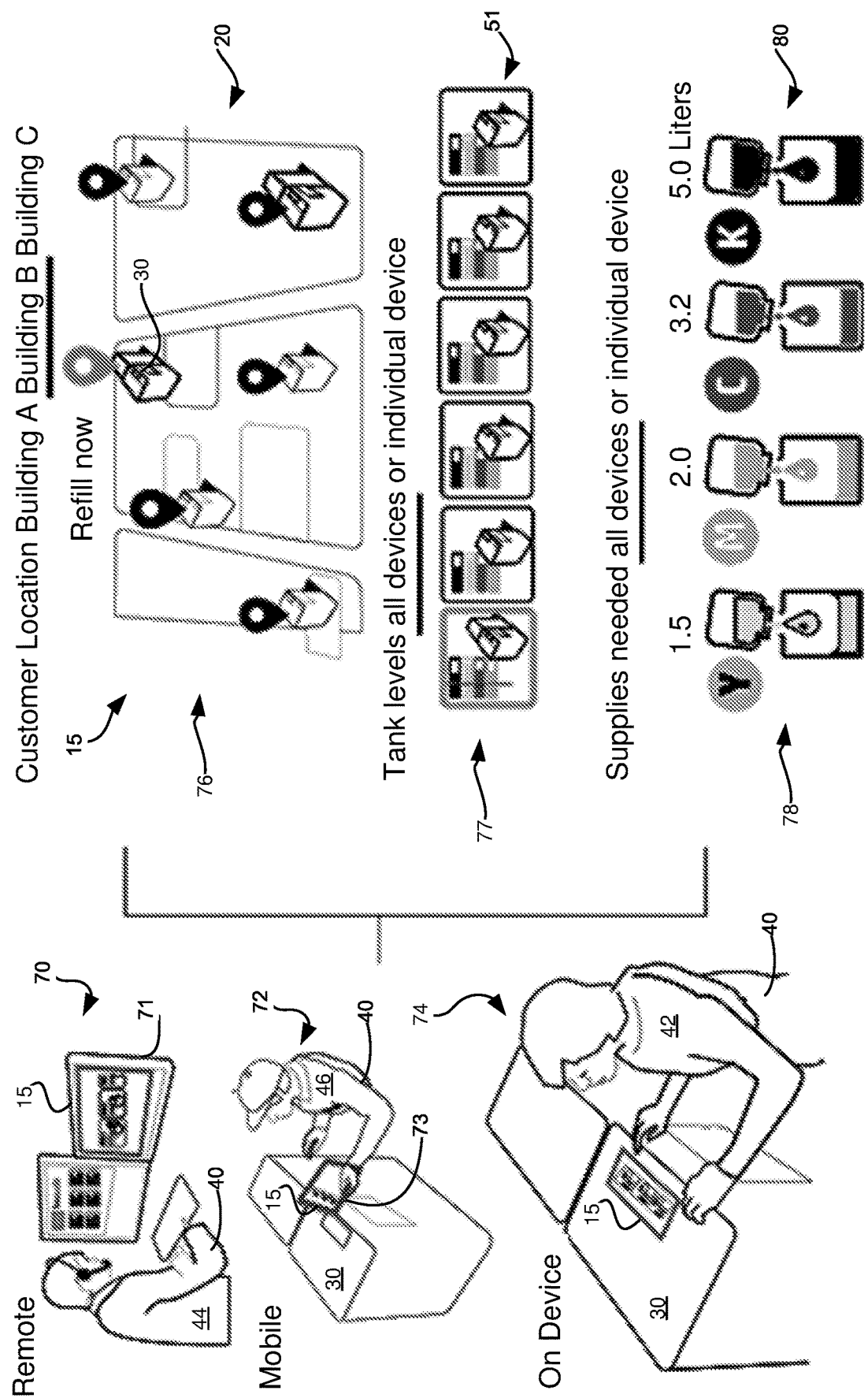
FIG. 3 is an illustration of example user interface for collective awareness of supplies and example multiple ways in which the user interface may be accessed.

FIG. 3 is an illustration of example user interfaces 15 for collective awareness of supplies 80 and example multiple ways in which the user interface 15 may be accessed. User interface 15 in this example has three main views. First view 76 shows the location of a printer device 30 respective to other printer devices 30 in first fleet 20 that needs servicing with a refill. In this first view 76, a map showing the physical location with a building B is shown, while views of printer devices 30 in alternate building A and C are possible. In other examples, rather than physical locations, a map of network locations could be shown along with physical location directions, such as post markings, floor levels, building grids, etc. Second view 77 illustrates the supply tank levels 51 for all printer devices 30 in the first fleet 20. Optionally, a responsible party 40 or another user 42 could display the supply tank level of the individual printer device 30. Third view 78 illustrates the total amount of replenishment supplies 80 needed for the entire first fleet 20, shown here in an amount of liters (L) for each color, such as 1.5 L for yellow, 2.0 L for magenta, 3.2 L for cyan, and 5.0 L for black. Alternatively, a responsible party 40 or another user 42 could display the supply tank level of the individual printer device 30. For some printer devices 30 that use cartridge systems, the total amount displayed could be in terms of cartridges needed rather than fluid amounts. User interface 15 may be accessed in multiple ways such as remotely 70 by a responsible party 40 such as via the Internet or local network on a remote computer 71, on-site 72 by a servicing technician 46 with a mobile computer such as on a handheld device 73 (or laptop, notebook, tablet, cell phone, etc.), or on device 74 such as the front display 15 on printer device 30 by a user 42 or other responsible party 40.

Figure 4A:
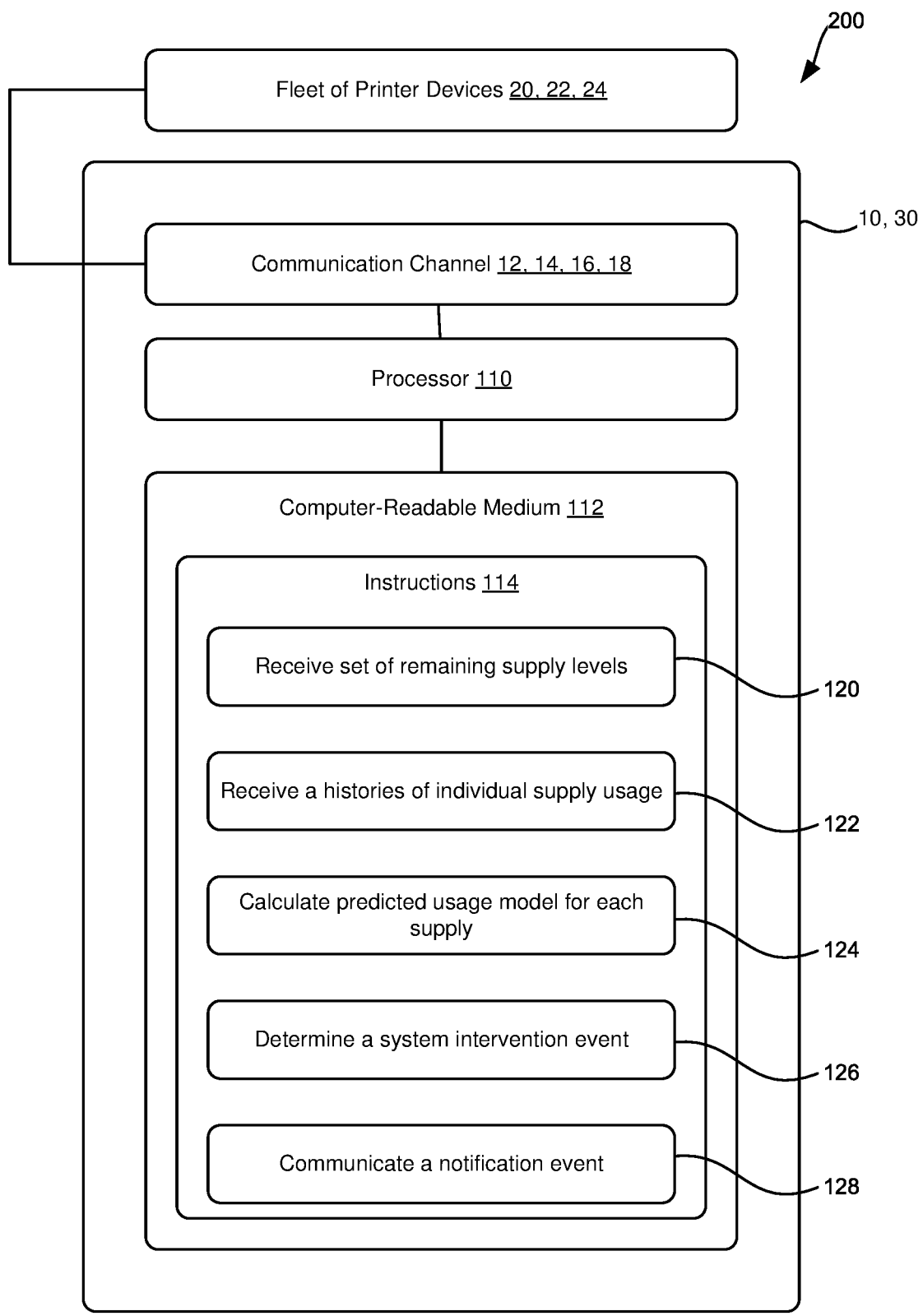
FIGS. 4A and 4B are block diagrams of an example system with instructions to implement collective awareness of supplies and example additional instructions, respectively.
Figure 4B:
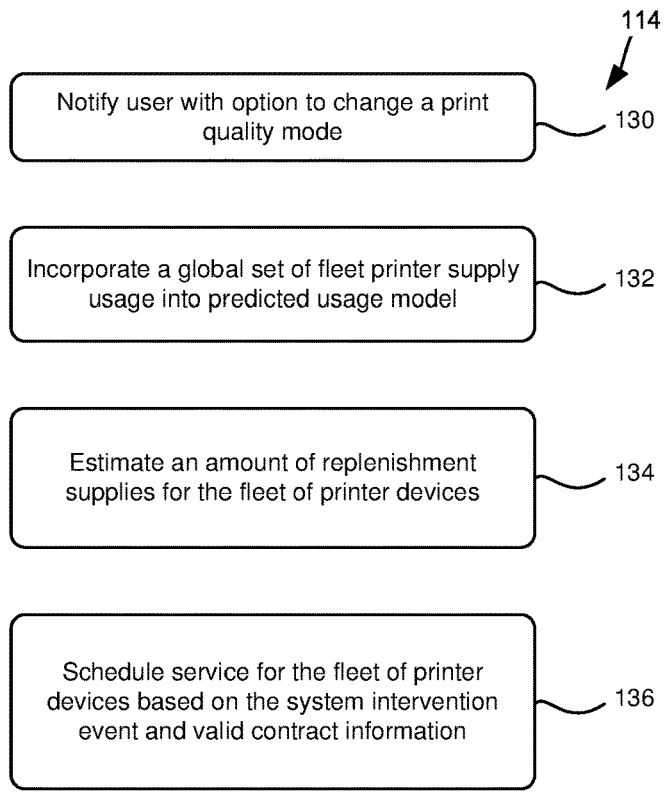

FIGS. 4A and 4B are block diagrams of an example system 200 with instructions 114 in FIG. 4A to implement collective awareness of supplies 80 and example additional instructions 114 in FIG. 4B. The computer-readable medium 112 holds instructions 114 that are readable and executable by processor 110.

In FIG. 4A, a system, which may be server 10 or any of the printer devices 30 includes the processor 110 and a communication channel 12, 14, 16, 18, and a computer-readable medium 112. The communication channel 12, 14, 16, 18 is coupled to printer devices 30 within a fleet 20, 22, 24 of printer devices 30. The instructions 114 may include instructions to receive from the printer device 30 a set of remaining supply levels 51 in block 120. In block 122 the instructions 114 cause the processor to receive a history of individual supply usage for pages 52 printed by the printer device 30 and other printer devices 30 with the fleet 20, 22, 24 of printer devices 30. In block 124, the instructions cause the processor to calculate a predicted usage model 50 for each supply of the printer device 30 from the history, and in block 126 determine a system intervention event 60 based on the predicted usage model and remaining level for each supply in the printer device 30. In block 128, the instructions 114 cause the processor 110 to communicate a notification 61 to a responsible party 40 based on the system intervention event 60 and a set of predefined thresholds 56 based on at least one of time, pages, and amount remaining of current supplies 80 within the fleet 20, 22, 24 of printer devices 30.

The various examples described herein may include logic or several components, modules, or constituents. Modules may constitute either software modules, such as code embedded in a tangible non-transitory machine or computer-readable medium 112 executed as instructions on processor 110 or hardware modules. A hardware module is a tangible unit capable of performing certain operations and be configured or arranged in certain manners. In one example, one or more computer systems or one or more hardware modules of a printer device 30 may be configured by software (e.g., an application, or a portion of an application) as a hardware module that operates to perform certain operations as described herein.

In some examples, a hardware module may be implemented as electronically programmable. For instance, a hardware module may include dedicated circuitry or logic that is permanently configured (e.g., as a special-purpose processor, state machine, a field programmable gate array (FPGA) or an application specific integrated circuit (ASIC) to perform certain operations. A hardware module may also include programmable logic or circuitry (e.g., as encompassed within a general-purpose processor 30 or another programmable processor) that is temporarily configured by software to perform certain operations.

The tangible and non-transitory CRM 112 allows for storage of one or more sets of data structures and instructions 114 (e.g., software, firmware, logic) embodying or utilized by any one or more of the methodologies or functions described herein. The instructions 114 may also reside, completely or at least partially, within the static memory, the main memory, and/or within the processor 110 during execution by the printer device 30. The main memory and the processor memory also constitute CRM 112. The term "computer-readable medium" 112 may include single medium or multiple media (centralized or distributed) that store the one or more instructions or data structures. The CRM 112 may be implemented to include, but not limited to, solid-state, optical, and magnetic media whether volatile or non-volatile. Such examples include, semiconductor memory devices (e.g. Erasable Programmable Read-Only Memory (EPROM), Electrically Erasable Programmable Read-only Memory (EEPROM), and flash memory devices), magnetic discs such as internal hard drives and removable disks, magneto-optical disks, and CD-ROM (Compact Disc Read-Only Memory) and DVD (Digital Versatile Disc) disks.

In FIG. 4B, additional instructions 114 may in block 130 cause the processor 110 to notify a user 42 with an option to change a print quality mode of the printer device 30 to extend a time for the schedule of the service or to suggest printing at another of the fleet 20, 22, 24 of printer devices 30. In block 132, the additional instructions 114 may cause the processor 110 to incorporate a global set of fleet printer device supply usage from other fleets 20, 22, 24 of devices into the predicted usage model. In block 134, the additional instructions 114 may cause the processor to incorporate a global set of fleet printer device supply usage from other fleets 20, 22, 24 of printer devices 30 into the predicted usage model. In block 136, the additional instructions may cause the processor 110 to schedule service for the fleet 20, 22, 24 of printer devices 30 based on the system intervention event 60 and valid contract information 58 between the responsible party 40 and the possessor 44 of the fleet 20, 22, 24 of printer devices 30.

Figure 5A:
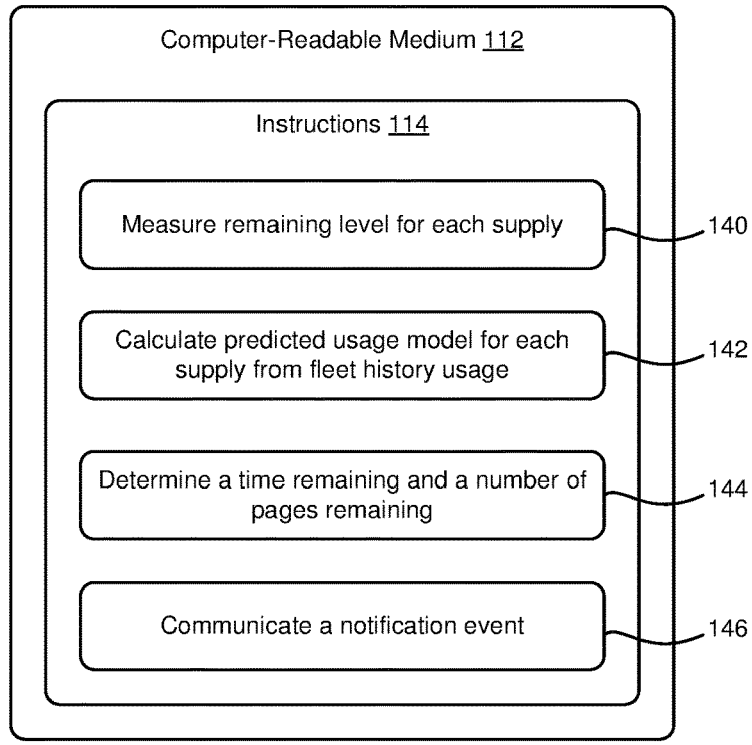
FIGS. 5A and 5B is a block diagram of a computer-readable medium storing example instructions to implement collective awareness of supplies and example additional instructions, respectively.

FIG. 5A a block diagram of a computer-readable medium 112 storing example instructions 114 to implement collective awareness of supplies 80. The instructions 114 that when read and executed by a processor 110 cause the processor to perform operations to implement the collective awareness. In block 140 the processor measures a remaining level for each supply in a printer device 30 within a fleet 20, 22, 24 of printer devices 30. In block 142, the processor calculates a predicted usage model 50 for each supply from a history of individual supply usage for printed pages over time for the printer device 30 and other printer devices 30 within the fleet 20, 22, 24 of printer devices 30. In block 144, the processor determines a time remaining and a number of pages remaining from the remaining level for each supply and the predicted usage model for each supply in the printer device 30. In block 146, the processor communicates a notification 61 to a responsible party 40 when at least one of the time remaining, the number of pages remaining, and the remaining level for each supply falls below a predetermined threshold.

Figure 5B:
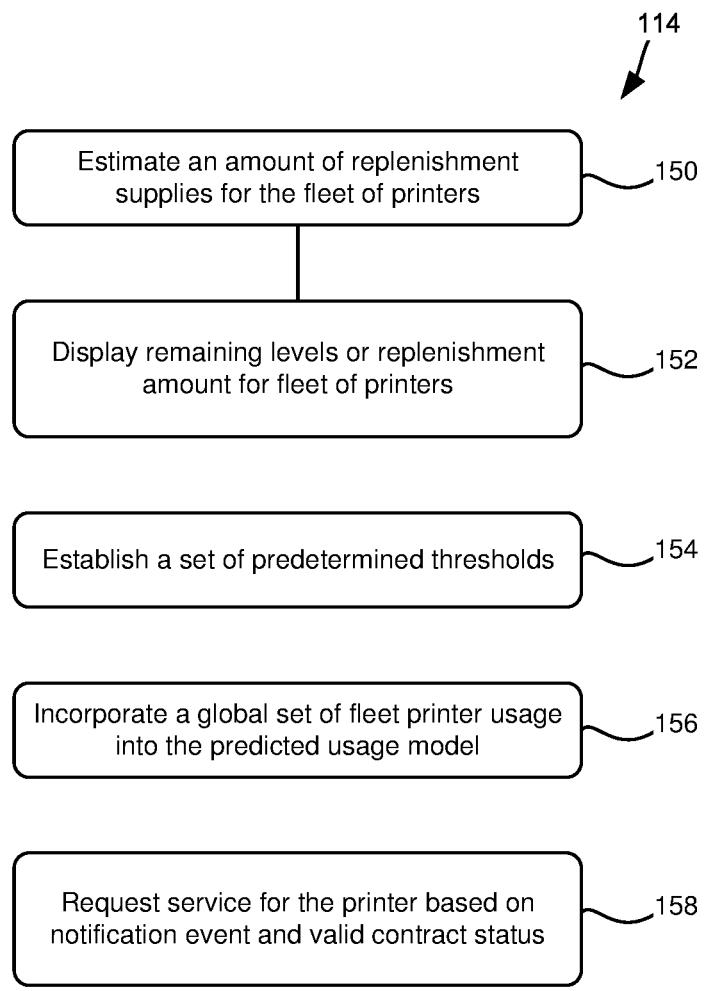

FIG. 5B is a block diagram of example additional instructions 114 that may be included on the computer-readable medium 112. In block 150, the processor may estimate an amount of replenishment supplies 80 for the printer device 30 and the fleet 20, 22, 24 of printer devices 30; and display at least one of remaining levels 51 of all printer devices 30 within the fleet 20, 22, 24 of printer devices 30 and the amount of replenishment amounts for all printer devices 30 in the fleet 20, 22, 24 of printer devices 30. In block 154, the processor 110 may allow the responsible party 40 to establish a set of predetermined thresholds for the printer device 30. In block 156, the processor 110 may incorporate a global set of fleet printer device supply usage from other fleets 20, 22, 24 of printer devices 30 into the predicted usage model 50. In block 158, the processor 110 may request service for the printer device 30 and the fleet 20, 22, 24 of other printer devices 30 based on the notification 61 and valid contract information 58 between the responsible party 40 and the possessor 44 of the fleet 20, 22, 24 of printer devices 30.

Figure 6A:
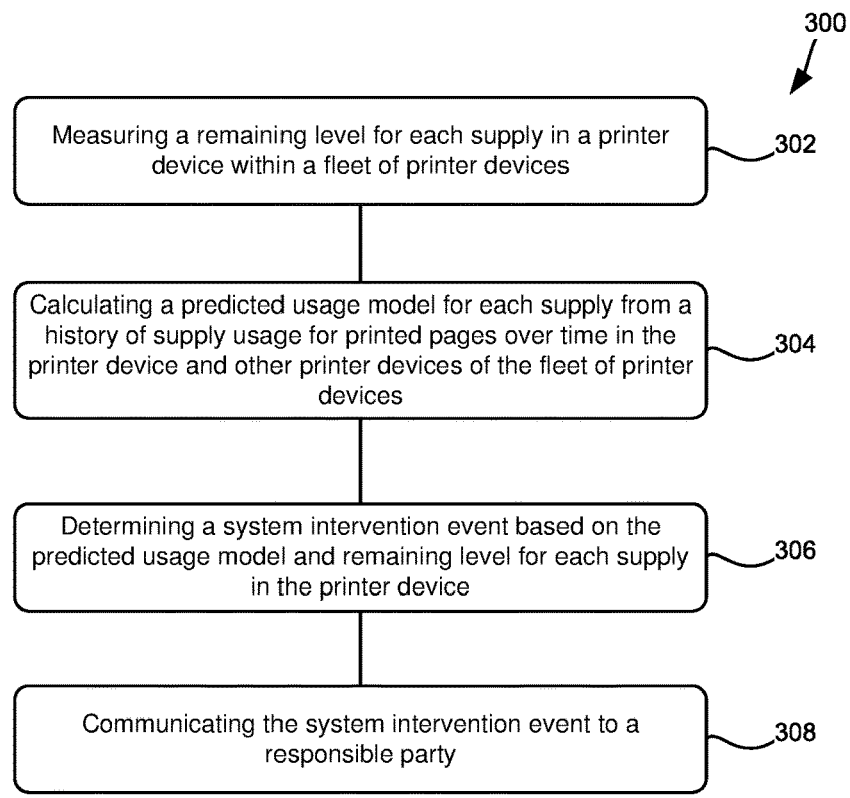
FIG. 6A is a flowchart of an example method for the collective awareness of supplies.

FIG. 6A is a flowchart of an example method 300 for collective awareness of supplies 80. In block 302, the method includes an operation of measuring a remaining level for each supply in a printer device 30 within a fleet 20, 22, 24 of printer devices 30. Measuring a remaining level may apply to integrated print cartridges, supplies, tanks for N number of inks and/or toners whether color or mono. The cartridges, supplies, or tanks may include continuous level sensors or other types of supply monitoring technology. In some examples, the measuring of a remaining level may be performed by a full height continuous level sensor that is integrated into a supply tank. In other examples, the amount of marking material used may be kept track of and subtracted from a full amount to arrive at a remaining level. In still other examples, there may be a combination of tank supply level monitoring and marking material usage combined to provide an accurate remaining level.

In block 304, the method includes an operation of calculating a predicted usage model 50 for each supply from a history of supply usage for printed pages over time in the printer device 30 and other printer devices 30 of the fleet 20, 22, 24 of printer devices 30. The predicted usage may be evaluated over a time duration, cyclical events, number of pages, etc. as discussed previously. In block 306, the method includes the operation of determining a system intervention event 60 based on the predicted usage model 50 and remaining level for each supply in the printer device 30. In block 306, the method includes the operation of communicating the system intervention event 60 to a responsible party 40. The system intervention event 60 may represent a print cartridge or supply replacement or a supply tank or cartridge refill. Communicating may include displaying, texting, emailing, posting, or otherwise sending the system intervention event 60. The system intervention event 60 may include remaining time, the number of pages until a printer device 30 will run out of a supply, the scheduling of a service event, or be a set of notifications 61.

Figure 6B:
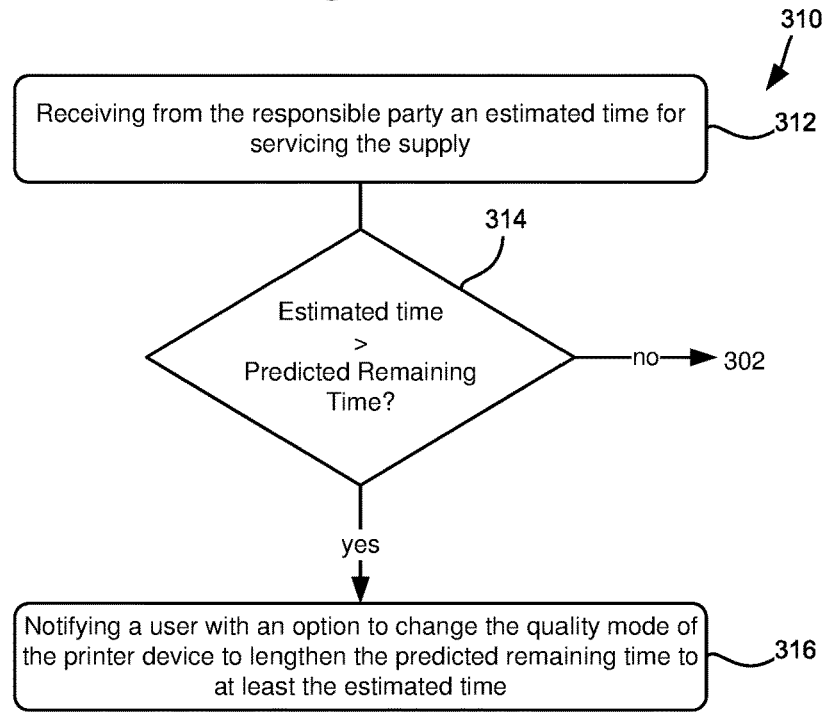
FIGS. 6B and 6C are flowcharts of example additional method operations that can be incorporated into the method of FIG. 6A.
Figure 6C:
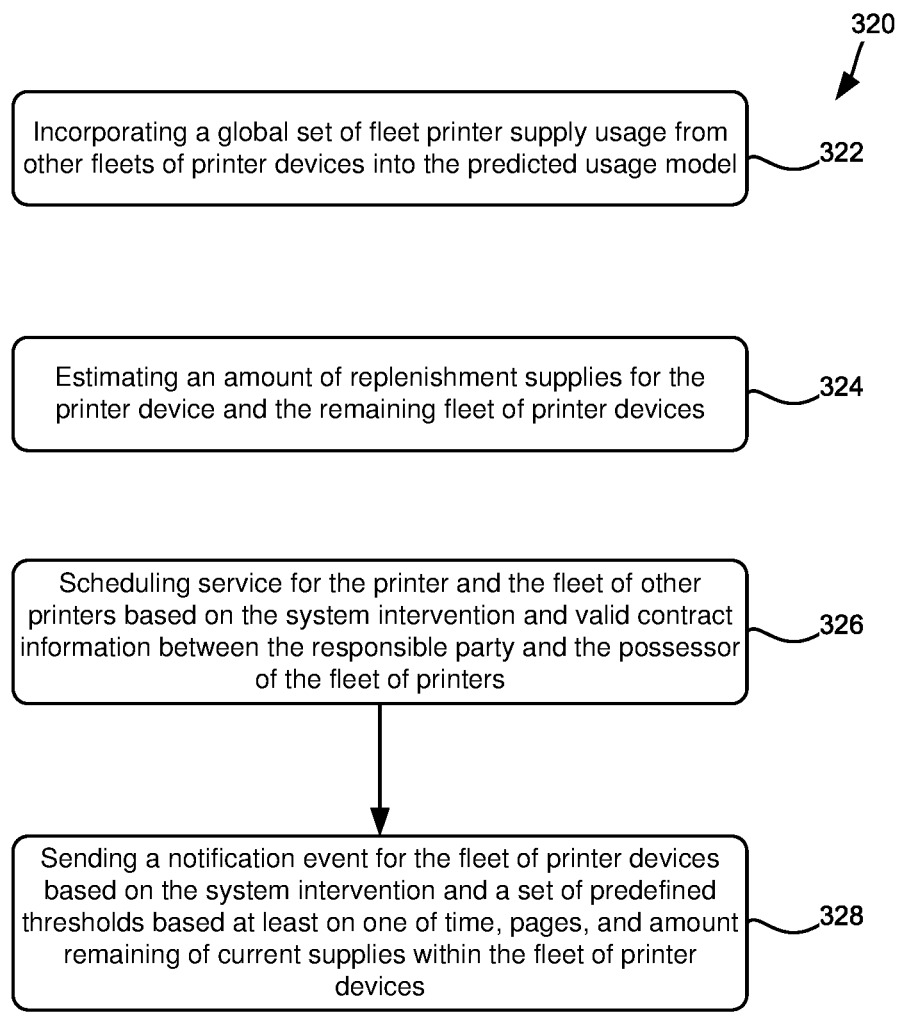

FIGS. 6B and 6C are flowcharts of example additional method operations 310 and 320, respectively, that can be incorporated into the method of FIG. 6A. For instance, the responsible party 40 upon receiving the communication may respond with an expected time for service of the printer device 30. Accordingly, in block 312, the method may include receiving from the responsible party 40 an estimated time for servicing the supply, and in decision block 314 determine if the estimated time is after a predicted remaining time before a supply runs out. If so, then the method may include the operation in block 316 of notifying a user 42 with an option to change the quality mode of the printer device 30 to lengthen the predicted remaining time to at least the estimated time. For example, if the printer device 30 is printing in a professional or a general office mode then a draft mode, an economy mode, or an essential print mode may be chosen that uses less supply allowing the method in block 304 to calculate a new predicted usage model and a predicted remaining time from that usage model. In some examples, the user 42 may be notified to print on a different printer device 30 in the fleet 20, 22, 24 until service can be performed.

An essential print mode may be a printer mode where color is depleted by up to 85% to deliver light color pages at the same cost per page as mono pages. This essential mode allows the reservoir and supply yield to increase by nearly seven times when selected. Once the essential mode is selected, the method may notify the user 42 updated predictions for remaining time or number of remaining pages until a supply be replenished. In some examples, the predicted usage model 50 uses the history of what percentage of pages are printed in each mode into the prediction model. For instance, if 20% of the pages are printed in professional mode, 10% of pages are printed in general office mode, and 70% of pages are printed in essential mode, the prediction usage model 50 may weight its prediction of use on this usage of different modes.

In FIG. 6C, the method 320 may include as shown in block 322 an additional operation of incorporating a global set of fleet printer device supply usage or global statistics 55 from other fleets 20, 22, 24 of printer devices 30 into the predicted usage model 50. That is, the history of supply usage, printing modes, and other global statistics 55 of other fleets 20, 22, 24 of printer devices 30 may be used to help fine-tune or adjust the predicted usage model 50. For instance, the history from other fleets 20, 22, 24 may indicate that as a printer device 30 has its supply depleted, the users 42 notice the low supply level and adjust their printing to other printers in the fleet. Thus, there may be a change in the trend of printing as a particular type of printer's supply goes low depending on how the supply level is communicated to the user 42, the availability of other printers to transfer the printing to, and the availability of correct media supplies at the other printers. For instance, if a fleet 20, 22, 24 of printers has mostly letter and legal paper available and the printer device 30 that has a low supply has an A4-sized print job, the global statistics 55 may not be used. However, if the printer device 30 with the low supply has a letter-sized print job available and it's likely that other users 42 with letter-sized print jobs would use the alternative printers in the fleet, then the prediction usage model 50 may change the time remaining but not the number of pages remaining.

In block 324, the method 320 may include the operation of estimating an amount of replenishment supplies 80 for the printer device 30 and the remaining fleet 20, 22, 24 of printer devices 30. This operation allows for reducing the cost of servicing the fleet 20, 22, 24 as the service provider 40 may only make one trip to top off a plurality of printers in the fleet. For example, with a customer site, there may be several printers (including A4-sized table top and A3-sized floor standing copiers) and a single service request may be generated to top off the entire fleet 20, 22, 24 based on any one printer device 30 predicted usage model 50 of remaining ink levels 51. This minimizes the number of visits for service technician responsible parties 40.

In comparison with a cartridge-based non-collective awareness of supplies printing system, individual replacement cartridges may be shipped to customers for each printer device 30 for the fleet 20, 22, 24 leading to a higher logistics cost, a higher risk of cartridges replaced prematurely, and potential confusion as to which printer device 30 triggered the supply order. Accordingly, by having a collective awareness of the supplies 80 for all printer devices 30 within a fleet, servicing of the fleet 20, 22, 24 may be less expensive, more efficient, and allow for more productive service personnel.

In block 326, the method 320 may include the operation of scheduling service for the printer device 30 and the fleet 20, 22, 24 of other printer devices 30 based on the system intervention event 60 and valid contract information 58 between the responsible party 40 and the possessor 44 of the fleet 20, 22, 24 of printer devices 30 and in block 328 the operation of sending a notification 61 for the fleet 20, 22, 24 of printer devices 30 based on the system intervention event 60 and a set of predefined thresholds based at least on one of time, pages, and amount remaining of current supplies 80 within the fleet 20, 22, 24 of printer devices 30. The user interface 15 of a printer device 30 may allow the user 42 or a responsible party 40 to set pre-defined thresholds (expressed in days remaining, pages remaining, or amount of supply remaining). By having adjustable pre-defined thresholds, these thresholds may be adapted to allow a service provider's existing service scheduling system to accommodate the collective awareness of supplies 80 for the fleets 20, 22, 24 of printers the service provider manages. The pre-defined thresholds for triggering the notifications 61 may be pre-set when the service provider deploys the fleets 20, 22, 24 of printer devices 30. If the usage of the printer devices 30 within the fleet 20, 22, 24 changes, the pre-defined thresholds may be adjusted as needed, remotely, locally with handheld or other computing devices, or on the device using the front panel user interface 15 as noted in FIG. 3.

In summary, responsible parties 40 may access supplies 80 status for all printer devices 30 on-site while at a printer device 30 that needs supplies attention, thus eliminating the requirement to visit every printer device 30 to do this assessment. Further, responsible parties 40 may assess the sum totality of supplies 80 required for replenishment for the fleet 20, 22, 24 at an entire location without the need to individually tally the needs. Guesswork on how much supplies 80 are needed is reduced or eliminated. Prioritization of the replenishment may be done on-site or off-site. Multiple trips to a supply depot may be reduced or eliminated while multiple trips by responsible parties 40 such a field technician may be reduced as their awareness of other needed supplies 80 is increased. The gathering and reporting of total supply replenishment are accomplished by the server 10 and easily accessed at any printer device 30 location. This automatic learning and simplified reporting reduce or eliminate the need for non-technical responsible parties 40 to learn and use complex or heavy-handed remote monitoring tools. By being able to monitor fleet supply status accurately, downtime is reduced thereby increasing overall staff efficiency and productivity.

While the claimed subject matter has been particularly shown and described with reference to the foregoing examples, those skilled in the art will understand that many variations may be made therein without departing from the intended scope of subject matter in the following claims. This description should be understood to include all novel and non-obvious combinations of elements described herein, and claims may be presented in this or a later application to any novel and non-obvious combination of these elements. The foregoing examples are illustrative, and no single feature or element is to be used in all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method for collective awareness of supplies, comprising:
    measuring a remaining level for a refillable supply in each printer device within a fleet of printer devices;
    displaying at any printer device remaining levels for the refillable supplies in all the printer devices within the fleet;
    displaying at any printer device a total replenishment supply needed to top off all the refillable supplies in the printer devices within the fleet;
    calculating a predicted usage model for the refillable supply in each printer device from a history of supply usage for printed pages over time in the printer device and other printer devices of the fleet of printer devices;
    determining a system intervention event based on the predicted usage model and the remaining level for the refillable supply in each printer device;
    communicating the system intervention event to a responsible party;
    scheduling service for the fleet of printer devices to top off the refillable supplies in multiple of the printer devices within the fleet based on the system intervention event and to minimize a number of service visits by the responsible party.

2. The method of claim 1, further comprising:
    receiving from the responsible party an estimated time for servicing the refillable supply in each printer device; and
    if the estimated time is after a predicted remaining time, notifying a user with an option to change the quality mode of each printer device to lengthen the predicted remaining time to at least the estimated time.

3. The method of claim 1, further comprising incorporating a global set of fleet printer device supply usage from other fleets of printer devices into the predicted usage model.

4. The method of claim 3, further comprising estimating an amount of replenishment supplies for the fleet of printer devices.

5. The method of claim 1, further comprising:
    sending a notification for the fleet of printer devices based on the system intervention event and a set of predefined thresholds based at least on one of time, pages, and amount remaining of current supplies within the fleet of printer devices.

6. A system for the collective awareness of supplies, comprising:
    a processor;

a communication channel coupled to the processor and each printer device within a fleet of printer devices;

a computer readable medium coupled to the processor and including instructions that when read and executed by the processor cause the processor to:

receive from each printer device a remaining level of a refillable supply in the printer device;

display at any printer device the remaining levels for the refillable supplies in all the printer devices within the fleet;

display at any printer device a total replenishment supply needed to top off all the refillable supplies in the printer devices within the fleet;

receive a history of individual supply usage for pages printed by each printer device;

calculate a predicted usage model for the refillable supply in each printer device from the history;

determine a system intervention event based on the predicted usage model and remaining level for the refillable supply in each printer device;

communicate a notification to a responsible party based on the system intervention event; and schedule service for the fleet of printer devices to top off the refillable supplies in multiple of the printer devices within the fleet based on the system intervention event and to minimize a number of service visits by the responsible party.

7. The system of claim 6, wherein the instructions further cause the processor to notify a user with an option to change a print quality mode of each printer device to extend a time for the schedule of the service or to suggest printing at another of the fleet of printer devices.

8. The system of claim 6, wherein the instructions further cause the processor to incorporate a global set of fleet printer device supply usage from other fleets of printer devices into the predicted usage model.

9. The system of claim 6, wherein the instructions further cause the processor to estimate an amount of replenishment supplies for the fleet of printer devices.

10. The system of claim 6, wherein the service is further scheduled based on valid contract information between the responsible party and the possessor of the fleet of printer devices.

11. A non-transitory computer-readable medium for collective awareness of supplies comprising instructions that when read and executed by a processor cause the processor to:

measure a remaining level for a refillable supply in each printer device within a fleet of printer devices;

display at any printer device remaining levels for the refillable supplies in all the printer devices within the fleet;

display at any printer device a total replenishment supply needed to top off all the refillable supplies in the printer devices within the fleet;

calculate a predicted usage model for the refillable supply in each printer device from a history of individual supply usage for printed pages over time for the printer device and other printer devices within the fleet of printer devices;

determine a time remaining and a number of pages remaining from the remaining level for the refillable supply in each printer device and the predicted usage model for the refillable supply in the printer device;

communicate a notification of a system intervention event to a responsible party when at least one of the time remaining, the number of pages remaining, and the remaining level for the refillable supply in any printer device falls below a predetermined threshold; and schedule service for the fleet of printer devices to top off the refillable supplies in multiple of the printer devices within the fleet based on the system intervention event and to minimize a number of service visits by the responsible party.

12. The non-transitory computer-readable medium of claim 11 wherein the instructions further cause the processor to:

estimate an amount of replenishment supplies for the fleet of printer devices.

13. The non-transitory computer-readable medium of claim 11 wherein the instructions further allow the responsible party to establish a set of predetermined thresholds for each printer device.

14. The non-transitory computer-readable medium of claim 11 wherein the instructions further cause the processor to incorporate a global set of fleet printer device supply usage from other fleets of printer devices into the predicted usage model.

15. The non-transitory computer-readable medium of claim 11 wherein the service is further scheduled based on valid contract information between the responsible party and the possessor of the fleet of printer devices.

* * * * *